(12) United States Patent
Sabsevitz et al.

(10) Patent No.: US 8,126,856 B2
(45) Date of Patent: Feb. 28, 2012

(54) FILE ACCESS MANAGEMENT SYSTEM

(75) Inventors: Arthur L Sabsevitz, Monroe Township, NJ (US); Ronald John Luman, II, Cupertino, CA (US); Don Capps, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1743 days.

(21) Appl. No.: 11/138,020

(22) Filed: May 26, 2005

(65) Prior Publication Data

US 2006/0271596 A1 Nov. 30, 2006

(51) Int. Cl.
*G06F 17/00* (2006.01)

(52) U.S. Cl. ...................................................... 707/694

(58) Field of Classification Search .................. 707/9, 8, 707/6, 205, 200, 694, 999.002
See application file for complete search history.

(56) References Cited

U.S. PATENT DOCUMENTS

| | | | | |
|---|---|---|---|---|
| 566,895 A * | 9/1896 | Dow | ................................. | 92/80 |
| 1,326,156 A * | 12/1919 | Elia | ........................... | 114/240 E |
| 5,237,682 A * | 8/1993 | Bendert et al. | ................. | 707/205 |
| 5,239,648 A * | 8/1993 | Nukui | .............................. | 707/10 |
| 5,535,375 A * | 7/1996 | Eshel et al. | ....................... | 703/27 |
| 5,664,186 A * | 9/1997 | Bennett et al. | ................. | 707/204 |
| 5,809,527 A * | 9/1998 | Cooper et al. | ................. | 711/133 |
| 6,070,230 A | 5/2000 | Capps | | |
| 6,523,013 B2 | 2/2003 | Shah | | |
| 6,601,048 B1 | 7/2003 | Gavan | | |
| 6,611,848 B1 * | 8/2003 | Bradley | ......................... | 707/201 |
| 6,633,980 B1 | 10/2003 | Johnson | | |
| 6,732,082 B1 | 5/2004 | Gavan | | |
| 6,889,249 B2 * | 5/2005 | Miloushev et al. | ........... | 709/213 |
| 7,035,850 B2 * | 4/2006 | Arai et al. | .......................... | 707/6 |
| 7,036,149 B2 * | 4/2006 | Sonoda et al. | ................... | 726/27 |
| 7,219,830 B2 * | 5/2007 | West | .............................. | 229/115 |
| 2003/0074374 A1 * | 4/2003 | Karibe et al. | ............... | 707/104.1 |
| 2003/0105734 A1 * | 6/2003 | Hitchen et al. | .................... | 707/1 |
| 2003/0154381 A1 * | 8/2003 | Ouye et al. | ..................... | 713/182 |
| 2004/0111305 A1 | 6/2004 | Gavan | | |
| 2004/0210583 A1 * | 10/2004 | Enko et al. | ....................... | 707/10 |
| 2004/0240297 A1 | 12/2004 | Shimooka | | |
| 2005/0114381 A1 * | 5/2005 | Borthakur et al. | ............ | 707/102 |
| 2005/0182774 A1 * | 8/2005 | Weir et al. | ..................... | 707/100 |
| 2005/0251508 A1 * | 11/2005 | Shimizu | ............................ | 707/2 |
| 2005/0251537 A1 * | 11/2005 | Schwols et al. | ............... | 707/200 |
| 2006/0004787 A1 * | 1/2006 | Borthakur et al. | ............ | 707/100 |
| 2006/0277184 A1 * | 12/2006 | Faitelson et al. | .................. | 707/9 |
| 2007/0094354 A1 * | 4/2007 | Soltis | ............................ | 709/218 |
| 2007/0100834 A1 * | 5/2007 | Landry et al. | .................... | 707/10 |
| 2007/0154191 A1 * | 7/2007 | Ando et al. | ..................... | 386/126 |

* cited by examiner

*Primary Examiner* — John R. Cottingham
*Assistant Examiner* — Mohammed R Uddin

(57) ABSTRACT

In one embodiment a method of managing file access in a computer system comprises recording at least one file access attribute information over a period of time; generating one or more file access policies based on the access attribute information; and managing one or more subsequent file access requests in accordance with the one or more file access policies.

27 Claims, 7 Drawing Sheets

FILE ACCESS MANAGEMENT SYSTEM

TECHNICAL FIELD

This application relates to electronic computing, and more particularly to a file access management system.

BACKGROUND

Computer system security remains an important issue. As computer networks expand, the opportunity for malicious attacks on computer systems expands concomitantly. Hence, additional computer security techniques are desirable.

SUMMARY

In one embodiment a method of managing file access in a computer system comprises recording a plurality of file access attribute information over a period of time; developing one or more file access policies based on the access attribute information; and managing one or more subsequent file access requests in accordance with the one or more file access policies.

DETAILED DESCRIPTION

Described herein are exemplary system and methods for managing file access in a computer system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
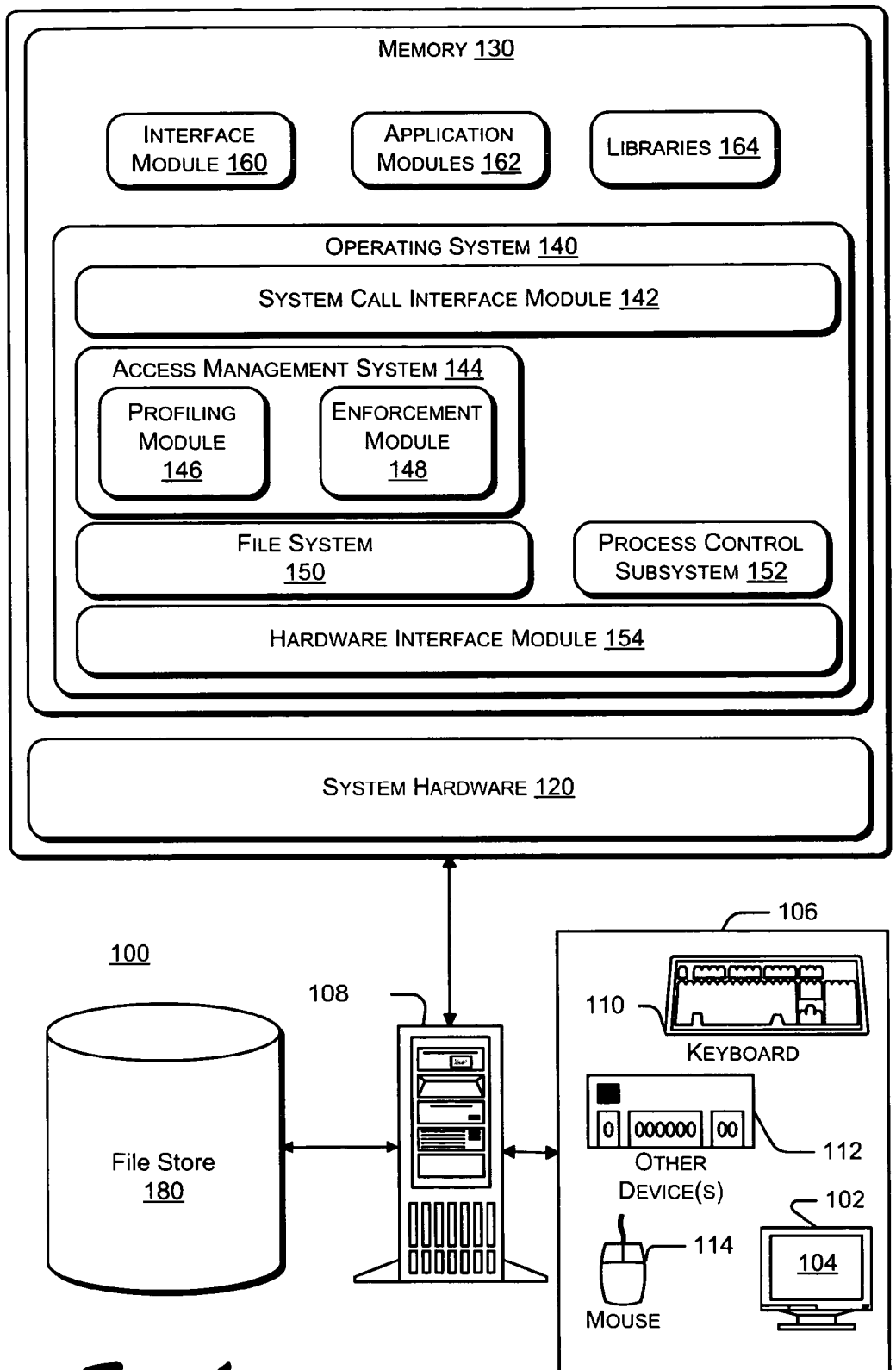
FIG. 1 is a schematic illustration of one embodiment of a file access management system.

FIG. 1 is a schematic illustration of an exemplary computer system adapted to include a file access management system 100. The file access management system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes a file system 150 that manages files used in the operation of computer 108 and a process control subsystem 152 that manages processes executing on computer 108. Operating system 140 further includes a system call interface module 142 that provides an interface between the operating system 140 and one or more application modules 162 and/or libraries 164.

In operation, one or more application modules 162 and/or libraries 164 executing on computer 108 make calls to the system call interface module 142 to execute one or more commands on the computer's processor. The system call interface module 142 invokes the services of the file system 150 to manage the files required by the command(s) and the process control subsystem 152 to manage the process required by the command(s). The file system 150 and the process control subsystem 152, in turn, invoke the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In one embodiment operating system includes an access management system 144 interposed logically between the system call interface module 142 and the file system 150. Access management system 144 includes a profiling module 146 and an enforcement module 148. An interface module 160 resides at the application (i.e., user) level to provide an interface with access management system 144. In operation, the profiling module 146 of access management system 144 may be configured to intercept file access requests directed to file system 150 over a period of time to generate a profile of file access requests for a specific file or group of files. The enforcement module 148 may use one or more access policies developed from the profiles of file access requests to generate one or more file access policies to manage access to files in file store 180 or in memory 130. Details of the operation of access management system are described below.

Exemplary Embodiments of Operations

Figure 2:
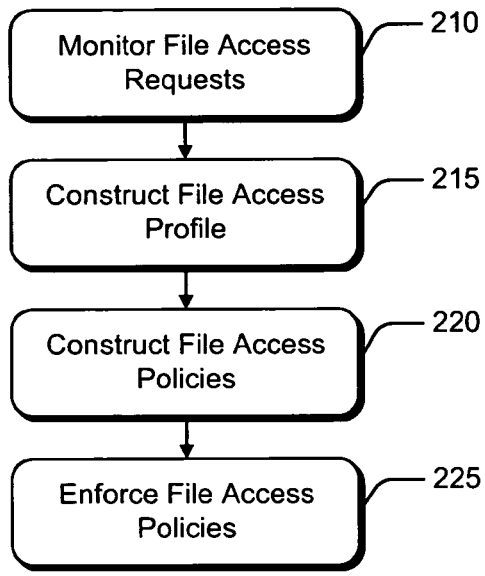
FIG. 2 is a flowchart illustrating operations in one embodiment of a file access management system.

FIG. 2 is a flowchart illustrating high-level operations in one embodiment of a method of managing file access implemented by file access management system 144. Referring briefly to FIG. 2, at operation 210 the access management system 144, and more particularly the profiling module 146, monitors file access requests to the file system 150. At operation 215 the access management system 144, and more particularly the profiling module 146, constructs a file access profile for each file or group of files managed by the file detection system 144. At operation 220 the file access management system 144, and more particularly the interface module 160, constructs a file access policy for each file or group of files managed by the file detection system 144. And at operation 225 the file access management system, and more particularly the enforcement module 148, enforces the access policy to manage access to each file or group of files managed by the file access management system 144. High-level operations depicted in FIG. 2 are explained in greater detail in the following text and the flowcharts of FIG. 3-FIG. 5.

Figure 3:
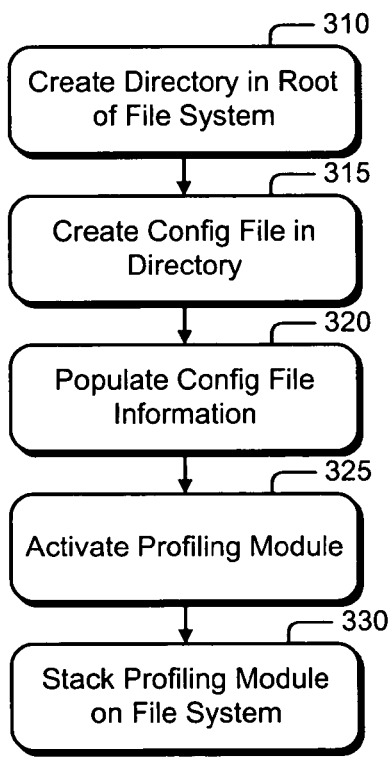
FIG. 3 is a flowchart illustrating operations in one embodiment of initializing a profiling module of a file access management system.

FIG. 3 is a flowchart illustrating operations in one embodiment of initializing a profiling module 146 of an access management system 144. By way of providing context, in one embodiment the access management system 144 may be implemented in a UNIX-based computing system. In a UNIX-based embodiment, at operation 310 the access management system 144 creates a file access directory in the root of each file system 150 that is linked to the access management system 144. At operation 315 the access management system 144 creates a configuration file in the file access directory created in operation 310. At operation 320 the access management system 144 populates the configuration file with the full pathnames of each file that is to be managed by the file access management system 144 and the access attributes that are to be profiled and enforced by the access management system 144.

In addition, the access management system 144 may maintain a global set of confidence level/notification pairs. These pairs specify rules for providing notification for any exceptions found by the enforcement module 148 based on the confidence level of the applied policy. For example, an exception to a policy with confidence level in the range 25-50% may be sent to the administrator via e-mail, while an exception to a confidence level greater than 95% may generate a console message and trigger an audible alarm.

In one embodiment the configuration file may be created and populated by an administrator using an administrative interface such as, e.g., the interface module 160. The administrative interface may enable an administrator to set administrative parameters which may include: disabling one or more of the profile and enforcement attributes for a file or group of files, selecting which files are to be targeted, and setting the confidence level/notification pairs described above. The administrative parameters may be stored in the configuration file or in a suitable storage mechanism such as, e.g., a database.

Once the administrative parameters are selected, profiling module 146 may be activated (operation 325). In one embodiment the interface module 160 may provide a mechanism for activating the profiling module 146. In a UNIX environment, the profiling module is stacked over the designated file system 150 (operation 330).

Figure 4:
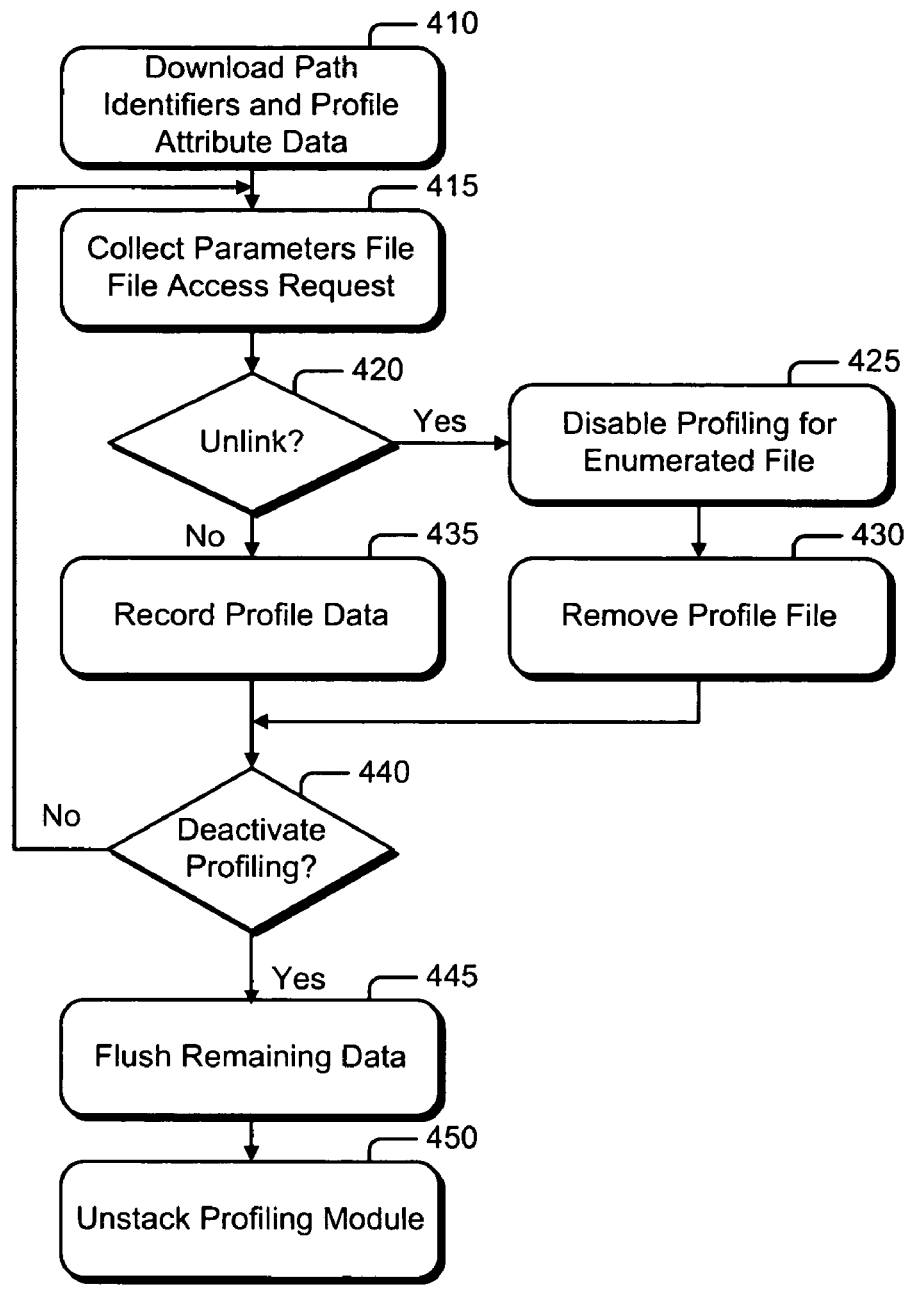
FIG. 4 is a flowchart illustrating operations in one embodiment of a profiling module of a file access management system.

FIG. 4 is a flowchart illustrating operations in one embodiment of a profiling module of access management system 144. At operation 410 the profiling module 146 downloads the path identifiers and the profile attributes specified in the configuration file. In a UNIX operating environment the path identifiers may be converted into their numbers, the profiling attribute data may be put into a binary representation and this data may be loaded into the profiling module 146. At operation 415 the profiling phase is initiated. As described above, an application module 162 interfaces to data in their files through system calls including, but not limited to open, read, write, mmap, unlink, etc., to one or more file systems 150. Profiling module 146 intercepts file system calls, collecting file access attribute information.

In one embodiment the access attribute information may include one or more of the following types of information: a time parameter such as, e.g., the time of access, an application identifier such as, e.g., an application inumber, an operation identifier such as, e.g., a type of operation, a file offset parameter such as, e.g., an offset in the file, a file modification method identifier, and size of access indicator. The time is the time of the operation. The application inumber is the unique dev/inumber of the application executable. The type of operation is either read, write, mmap, or a file lock/unlock operation. The offset is the offset in the file for the operation. The modification method is append mode or replacement. The size of access is the transfer amount or locking range. Additional information may be collected and stored.

If, at operation 420 the intercepted system call does not include an unlink request, then control passes to operation 435 and the profiling module 146 records the profile data in a suitable storage medium such as, e.g., a data file. Profiling module 146 may create a suitable data structure to store the attributes and profiling data collected at operation 415. In one embodiment the profiling module creates a per index node (inode) data structure and writes the access attribute information into the per-inode data structure associated with that file. A double buffer may be linked to the data structure to reduce latency effects. The access parameters from each matching access are stored in the buffer. When one buffer is full, its contents are written (or appended) to a file in the file system directory as described above. The alternate buffer may then be used. Each file's profile data is stored in a file in the file access directory named <inumber>.profile where <inumber> is the inumber of that file. Other techniques may be used to store the data.

By contrast, if, at operation 420, an intercepted file access request includes an unlink operation, then control passes to operation 425 and profiling is disabled for the file enumerated in the unlink operation. Control then passes to operation 430 and the file associated with the file identified in the file access request may be removed from the file access directory.

At operation 440 the profiling module determines whether profiling has been deactivated. In one embodiment the profiling module may be deactivated by an interrupt from the interface module 160. The interrupt may be generated manually, e.g., by an administrator, or automatically, e.g., by expiration of a threshold relating to the time of operation of profiling module 146 or the number of requests processed by profiling module 146. If profiling is not deactivated, then control passes back to operation 415 and the profiling module 146 processes the next file access request.

By contrast, if at operation 440 profiling has been deactivated, then control passes to operation 445 and any data remaining in the buffers is flushed to the storage media. At operation 450 the profiling module is unstacked from the underlying file system(s) 150.

The file access parameters collected during the analysis phase may be used to develop file access policies. In one embodiment, interface module 160 provides a user-level analysis tool for generating file access policies from the data collected and stored by the profiling module 146. The analysis tool analyzes the <inumber>.profile files, and the resulting access policies are mapped into file-specific templates that define the allowed access profile. The templates may be stored in a file <inumber>.policy in the file access directory.

In one embodiment entries in the template may include the following information: start time, duration, application inumber, application text checksum, ratio or read/write/mmaps, I/O pattern, ratio of append/non-append updates, size range of access, and file locking pattern. A confidence level indicator may be appended to the policy records.

The particular mechanism by which file access policies are generated from the profile data is not critical. The generated file policy is customizable by the administrator, who can augment or override the details of the policy.

Figure 5:
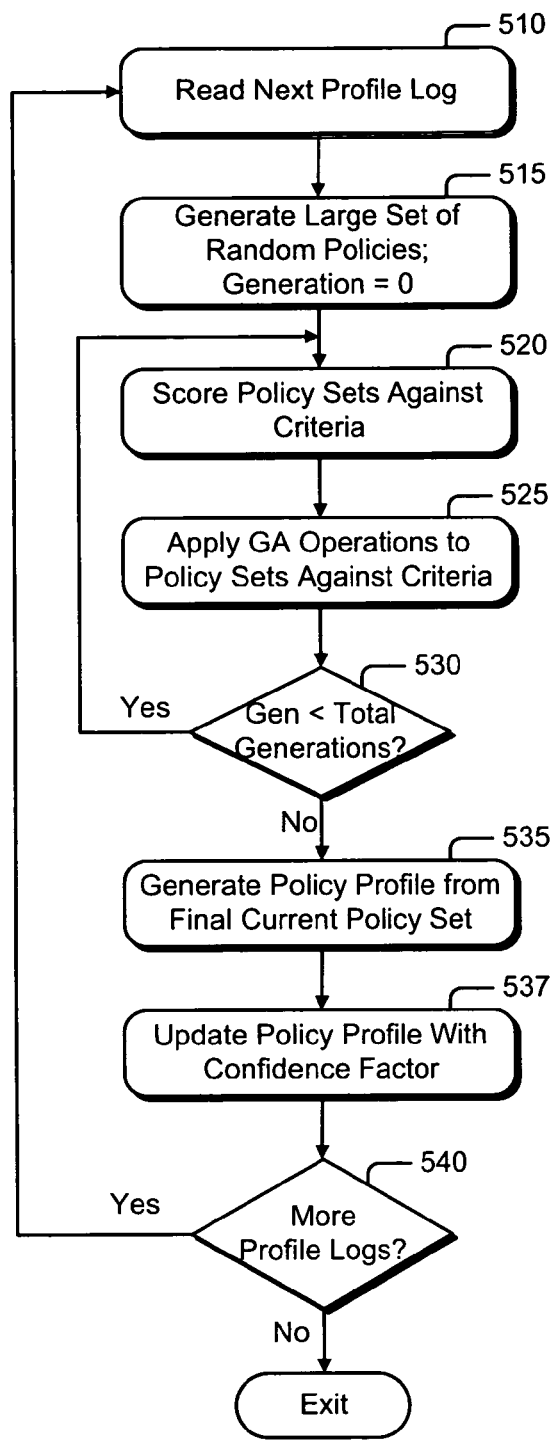
FIG. 5 is a flowchart illustrating operations in one embodiment of an interface module of a file access management system.

In one embodiment the interface module 160 implements one or more genetic algorithms to generate a set of access policies on a file-by-file basis. FIG. 5 is a flowchart illustrating operations in one embodiment of an interface module 160 of an access management system adapted to apply iteratively one or more genetic algorithms to the file access data collected by the profiling module 146. The operations of FIG. 5 may be performed on one or more files in the file access directory. At operation 510 the interface module 160 reads the next profile log in the file access directory. At operation 515 a large set of random policies sets is generated and an iteration counter is initialized.

At operation 520 each of the policy sets is applied against the recorded set of legitimate accesses as well as a set of randomly generated illegitimate accesses. In one embodiment the policy set may be scored according to the results of this application using the following formula: Score=x*(# of legitimate accesses allowed)+y*(# of illegitimate accesses denied)−z*(# of legitimate accesses denied)−w*(# of illegitimate accesses allowed)−v*number of policies in set. The factors (x,y,z,w,v) are scaling factors that may be manipulated and/or overridden by the user. One or more genetic algorithms (e.g., reproduction, crossover, mutation) are applied to the scored policy sets, resulting in a new set of policies. The particular genetic algorithm(s) used are not critical. Suitable genetic algorithms include one or more of selection, crossover, and mutation, or combinations thereof.

The scoring and genetic algorithm analysis may be repeated over multiple generations. If, at operation 530 it is determined that the current generation is less than the total number of generations allocated for the calculation, then control passes back to operation 520 and operations 520-530 may be repeated until the desired number of generations are completed.

At operation 535 the interface module 160 generates a profile policy from the final policy set resulting from operations 510-525. In one embodiment, the policy that maximizes the score recorded for use in the file access enforcement module 148 may be selected. A text checksum corresponding to the application inumber may be calculated and stored. In addition, at operation 537 a confidence factor may be computed for the resulting policy by applying the policy to a series of randomly generated accesses, in addition to the recorded profile accesses. The policy profile may be updated with the confidence factor. In one embodiment the confidence factor may be computed as the percentage of legitimate accesses allowed minus the percentage of random accesses allowed. This factor may be recorded in the last record prescribed above.

Figure 6:
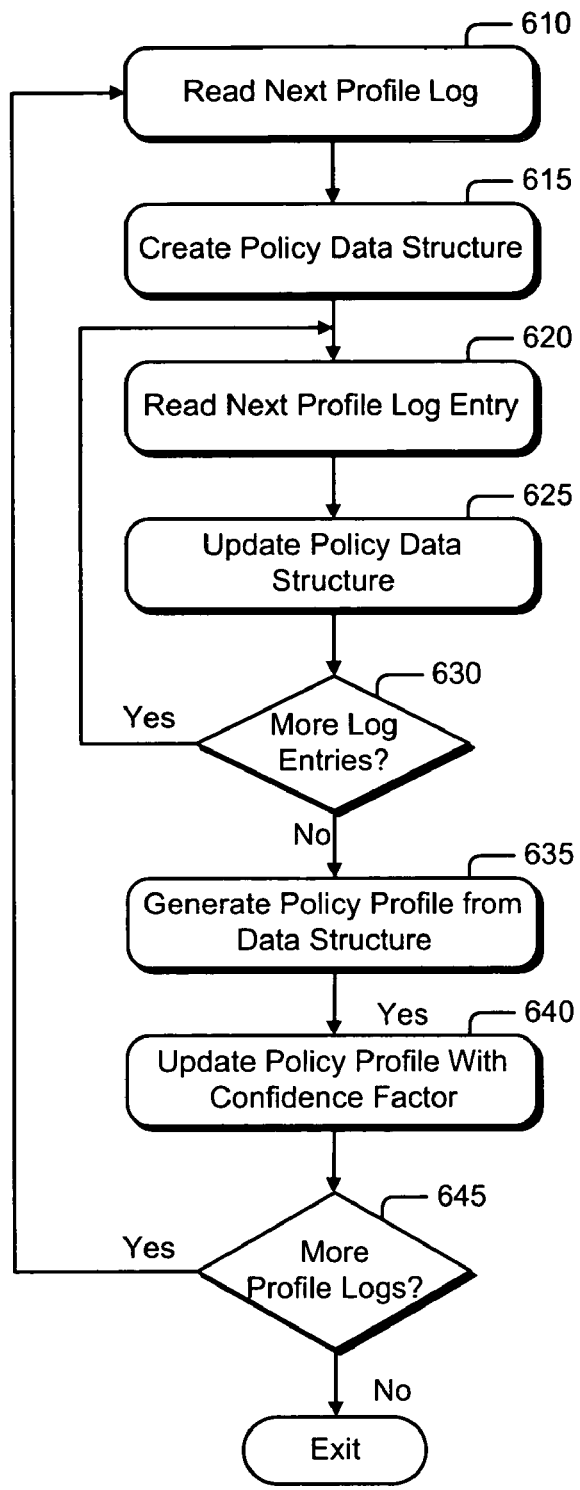
FIG. 6 is a flowchart illustrating operations in one embodiment of an interface module of a file access management system.

In one embodiment interface module 160 performs a statistical analysis of file access data collected by profiling module 146. FIG. 6 is a flowchart illustrating operations in one embodiment of an interface module 160 of an access management system 144 adapted to perform a statistical analysis of file access data. File access policies may be generated using a deterministic process that analyses each <inumber>.profile file. At operation 610 the interface module 160 reads the next profile log in the file access directory. At operation 620 the interface module 160 creates a policy data structure for the profile log read in operation 610. This data structure, which will be translated into a policy, stores a summary of the raw data needed to create the policy. A text checksum corresponding to the application inumber may be calculated and stored in the data structure.

At operation 620, the next entry in the profile log read in operation 610 is read. At operation 625 the data structure corresponding to the application inumber may be updated with the following information. A counter representing the appropriate access type (i.e., read/write/mmap) is updated. The access type and offset may be used to update the I/O pattern. In one embodiment the access type and offset may be analyzed using pattern recognition techniques described in U.S. Pat. No. 6,070,230, entitled Multi-Threaded Read Ahead Prediction by Pattern Recognition, the disclosure of which is incorporated herein by reference. The size-range of access is compared to the stored range, which is then increased to match the access, if needed. If the access type is 'file lock', then the profile record information is fed to the lock analysis subsystem, which updates the lock pattern field as necessary.

If at operation 630 there are more log entries in the profile log file, then control passes back to operation 620. By contrast, if at operation 630 there are no more entries in the profile log, then control passes to operation 635, and a policy profile is generated for the data structure. In the event that no information is present for a field or the configuration file specifies this attribute is not to be enforced, a value indicating 'don't care' is recorded.

In addition, at operation 640 a confidence factor may be computed for the resulting policy based on the variance or other statistical characteristics of the gathered profile. This factor may be recorded in the last record prescribed above.

If, at operation 645, there are more profile logs to analyze, the control passes back to operation 610 and the next profile log is processed. By contrast, if at operation 645 there are no more profile logs, then the analysis terminates.

Figure 7:
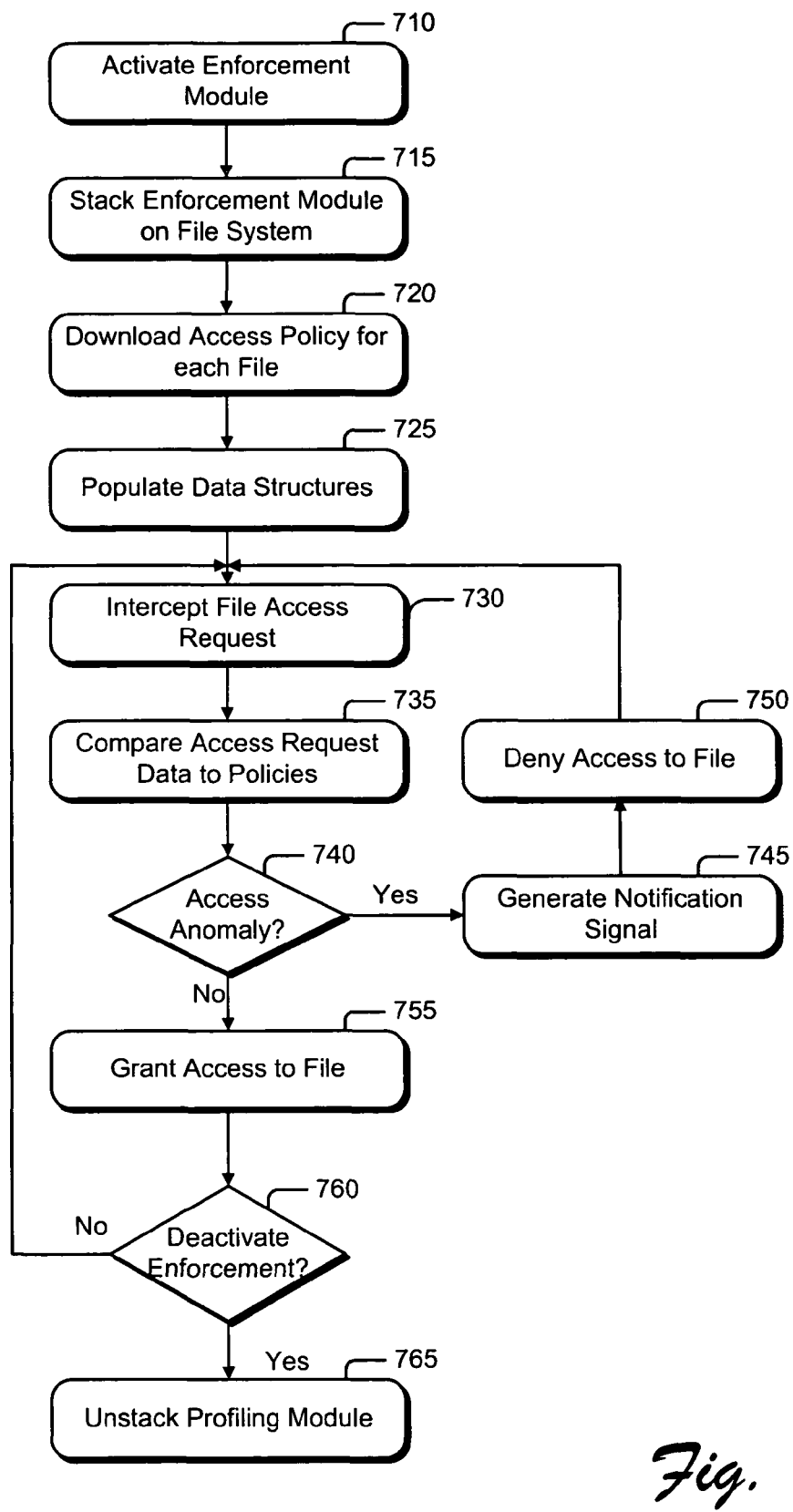
FIG. 7 is a flowchart illustrating operations in one embodiment of an enforcement module of a file access management system.

FIG. 7 is a flowchart illustrating operations in one embodiment of an enforcement module 148 of an access management system. Referring to FIG. 7, at operation 710 the enforcement module is activated. In one embodiment the enforcement module 148 may be activated from the interface module 160. In a UNIX operating environment the enforcement module is stacked on one or more designated file system(s) 150 (operation 715).

At operation 720 the enforcement module 148 downloads the file access policies for one or more files managed by the file system(s). And at operation 725 the file access policies are stored in a suitable data structure. In one embodiment the data structures correspond to a specific file managed by access management system 144. In a UNIX operating environment the data structures may be indexed by the files inode.

At operation 730 enforcement module 148 intercepts a file access request directed to the file system(s) 150. At operation 735 enforcement module 148 applies the file access policy (ies) to the data in the intercepted file access request data for the file enumerated in the file access request. In one embodiment enforcement module uses an indicator of the target file from the intercepted file access request to retrieve the file access policy(ies) for the target file. In a UNIX environment enforcement module 148 may match the inode enumerated in the intercepted file access request with the inode in the store of file access policies.

If, at operation 740, there is a file access anomaly, then control passes to operation 745 and the enforcement module generates a notification signal and may deny access to the file (operation 750). As used herein, the terms access anomaly refer to a failure of the data associated with an intercepted file access request to satisfy one or more conditions of a file access policy(ies) for the file(s) enumerated in the intercepted file access request. If the file access policy(ies) for the enumerated file include a confidence factor as described above, then the notification signal may include an indicator of the confidence factor. This indicator may be used by the access management system to invoke behaviors that vary as a function of the confidence level. By way of example, a file access policy for a specific file may enumerate four criteria for evaluation. If only three of the criteria are satisfied, then the notification signal may prompt access management system 144 to generate a warning to a user and/or administrator, and to log the anomaly in a log file for subsequent analysis. By contrast if only two criteria are satisfied, then the notification signal may prompt access management system 144 to lock down the file and generate an alarm that requires intervention by an authorized administrator before the file may be unlocked. Alternatively, the policy's confidence factor may be used as an absolute index into a notification table to determine notification method on any access anomaly. Other behaviors may be implemented.

By contrast, if no anomalies are detected at operation 740 then control passes top operation 755 and enforcement module 148 grants access to the file enumerated in the intercepted file access request. If, at operation 760, the enforcement module 148 has not been deactivated then control passes back to operation 730 and the enforcement module 148 intercepts another incoming file access request and repeats the analysis.

By contrast, if at operation 760 the enforcement module 148 is deactivated, then control passes to operation 765 and the enforcement module 148 is unstacked from the file system 150.

Exemplary Computing Environment

Select embodiments discussed herein (such as those discussed with reference to FIG. 1) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Figure 8:
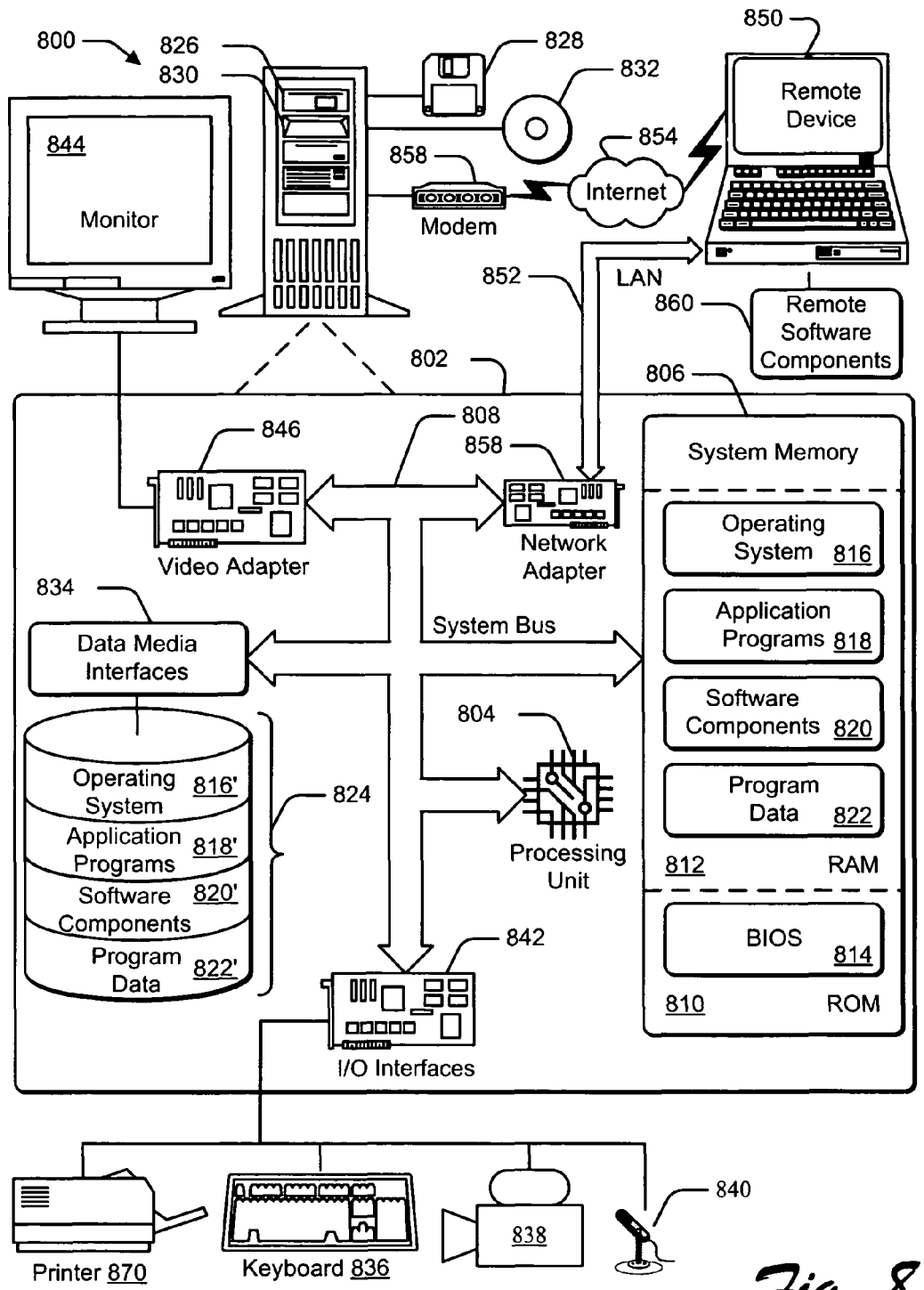
FIG. 8 is a schematic illustration of an exemplary computing environment.

The various components and functionality described herein are implemented with a number of individual computers. FIG. 8 shows components of typical example of such a computer, referred by to reference numeral 400. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 800 may include, but are not limited to, a processing unit 804, a system memory 806, and a system bus 808 that couples various system components including the system memory 806 to the processing unit 804. The system bus 808 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media and communication media. 'Computer storage media' includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 800, such as during start-up, is typically stored in ROM 810. RAM 812 typically contains data and/or program modules that are immediately accessible to and/or presently being operated on by processing unit 804. By way of example, and not limitation, FIG. 8 illustrates operating system 816, application programs 818, other software components 820, and program data 822.

The computer 800 may also include other removable/non-removable, volatile/nonvolatile computer storage media. By way of example only, the computer system of FIG. 8 may include a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, program modules, and other data for computer 800. In FIG. 8, for example, hard disk drive 824 is illustrated as storing operating system 816', application programs 818', software components 820', and program data 822'. Note that these components can either be the same as or different from operating system 816, application programs 818, software components 820, and program data 822. Operating system 816, application programs 818, other program modules 820, and program data 822 are given different numbers here to illustrate that, at a minimum, they are different copies. A user may enter commands and information into the computer 800 through input devices such as a keyboard 836 and pointing device 838, commonly referred to as a mouse, trackball, or touch pad. Other input devices (not shown) may include a microphone 840, joystick, game pad, satellite dish, scanner, or the like. These and other input devices are often connected to the processing unit 804 through an input/output (I/O) interface 842 that is coupled to the system bus, but may be connected by other interface and bus structures, such as a parallel port, game port, or a universal serial bus (USB). A monitor 844 or other type of display device is also connected to the system bus 806 via an interface, such as a video adapter 846. In addition to the monitor 844, computers may also include other peripheral output devices (e.g., speakers) and one or more printers 870, which may be connected through the I/O interface 842.

The computer may operate in a networked environment using logical connections to one or more remote computers, such as a remote computing device 850. The remote computing device 850 may be a personal computer, a server, a router, a network PC, a peer device or other common network node, and typically includes many or all of the elements described above relative to computer 800. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 800 is connected to the LAN 852 through a network interface or adapter 856. When used in a WAN networking environment, the computer 800 typically includes a modem 858 or other means for establishing communications over the Internet 854. The modem 858, which may be internal or external, may be connected to the system bus 806 via the I/O interface 842, or other appropriate mechanism. In a networked environment, program modules depicted relative to the computer 800, or portions thereof, may be stored in the remote computing device 850. By way of example, and not limitation, FIG. 8 illustrates remote application programs 860 as residing on remote computing device 850. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method of managing file access in a computer system, comprising:
   recording file access attribute information over a period of time;
   generating one or more file access policies based on the file access attribute information; and
   managing one or more subsequent file access requests in accordance with the one or more file access policies.

2. The method of claim 1, wherein recording file access attribute information over a period of time comprises:
   creating a file structure comprising a plurality of path names associated with a corresponding plurality of files in the computer system;
   intercepting file access requests directed to a file system associated with the computer system; and associating one or more file access parameters from the file access requests with a corresponding path name in the file structure.

3. The method of claim 2, wherein:
the file structure comprises a configuration file;
the configuration file comprises the path name and one or more access parameters to be recorded.

4. The method of claim 1, wherein the file access attribute information includes one or more of:
a time of access;
an application identifier;
an operation identifier;
a file offset parameter;
a file modification method identifier; or
a size of access indicator.

5. The method of claim 1, wherein generating one or more file access policies based on the file access attribute information comprises performing a statistical analysis of the file access attribute information.

6. The method of claim 5, wherein generating one or more file access policies based on the file access attribute information comprises generating a confidence factor associated with the statistical analysis.

7. The method of claim 1, wherein generating one or more file access policies based on the file access attribute information comprises:
generating a random set of access policies;
applying the set of access policies to a set of recorded legitimate accesses and to a set of randomly generated illegitimate accesses; and
generating a first score for each set of access policies by applying a multi-factored scoring analysis to an outcome of the access policies; and
selecting one or more access policies based on the score;
iteratively creating a refined score by applying reproduction, crossover, and mutation in proportion to one or more individual policies of a previous generation; and
selecting one or more access policies based on the refined score after a number of iterations.

8. The method of claim 7, further comprising applying the access policies to one or more file access requests.

9. A computer system to manage file access, comprising:
a processor;
a memory module including logic instructions which, when executed by the processor, configure the processor to:
record file access attribute information over a period of time;
generate one or more file access policies based on the file access attribute information; and
manage one or more subsequent file access requests in accordance with the one or more file access policies.

10. The computer system of claim 9, further comprising logic instructions which, when executed by the processor, configure the processor to:
create a file structure comprising a plurality of path names associated with a corresponding plurality of files in the computer system;
intercept file access requests directed to a file system associated with the computer system; and
associate one or more file access parameters from the file access requests with a corresponding path name in the file structure.

11. The computer system of claim 9, wherein:
the file structure comprises a configuration file;
the configuration file comprises the path name and one or more access parameters to be recorded.

12. The computer system of claim 9, wherein the file access attribute information includes one or more of:
a time of access;
an application identifier;
an operation identifier;
a file offset parameter;
a file modification method identifier; or
a size of access indicator.

13. The computer system of claim 9, further comprising logic instructions which, when executed by the processor, configure the processor to perform a statistical analysis of the file access attribute information.

14. The computer system of claim 13, further comprising logic instructions which, when executed by the processor, configure the processor to generate a confidence factor associated with the statistical analysis.

15. The computer system of claim 9, further comprising logic instructions which, when executed by the processor, configure the processor to:
generate a random set of access policies;
apply the set of access policies to a set of recorded legitimate accesses and to a set of randomly generated illegitimate accesses; and
generate a first score for each set of access policies by applying a multi-factored scoring analysis to an outcome of the access policies;
iteratively create a refined score by applying reproduction, crossover, and mutation in proportion to one or more individual policies of a previous generation; and
select one or more access policies based on the refined score after a number of iterations.

16. The computer system of claim 15, further comprising logic instructions which, when executed by the processor, configure the processor to apply the access policies to one or more file access requests.

17. A computer program product comprising logic instructions stored on a computer-readable medium which, when executed by a computer processor, configure the processor to:
record file access attribute information over a period of time;
generate one or more file access policies based on the access attribute information; and
manage one or more subsequent file access requests in accordance with the one or more file access policies.

18. The computer program product of claim 17, further comprising logic instructions which, when executed by the processor, configure the processor to:
create a file structure comprising a plurality of path names associated with a corresponding plurality of files in the computer system;
intercept file access requests directed to a file system associated with the computer system; and
associate one or more file access parameters from the file access requests with a corresponding path name in the file structure.

19. The computer program product of claim 17, further comprising logic instructions which, when executed by the processor, configure the processor to perform a statistical analysis of the file access attribute information.

20. The computer program product of claim 19, further comprising logic instructions which, when executed by the processor, configure the processor to generate a confidence factor associated with the statistical analysis.

21. The computer program product of claim 17, further comprising logic instructions which, when executed by the processor, configure the processor to:
generate a random set of access policies;

apply the set of access policies to a set of recorded legitimate accesses and to a set of randomly generated illegitimate accesses; and generate a first score for each set of access policies by applying a multi-factored scoring analysis to an outcome of the access policies;

iteratively create a refined score by applying reproduction, crossover, and mutation in proportion to one or more individual policies of a previous generation; and select one or more access policies based on the refined score after a number of iterations.

22. The computer program product of claim 21, further comprising logic instructions which, when executed by the processor, configure the processor to apply the access policies to one or more file access requests.

23. A computer system, comprising:

a processor;

a memory module communicatively connected to the processor and including a file system for providing access to one or more files;

means for constructing a file access profile for at least one file managed by the file system;

means for constructing one or more file access policies using the file access profile;

means for enforcing the one or more file access policies to manage access to one or more files managed by the file system.

24. The computer system of claim 23, wherein the means for constructing a file access profile for at least one file managed by the file system comprises a profiling module that intercepts one or more file access requests generated by one or more application modules and constructs a file access profile using one or more characteristics of the intercepted file access requests.

25. The computer system of claim 23, wherein the means for constructing one or more file access policies using the file access profile comprises an interface module that applies a statistical analysis to one or more file access profiles.

26. The computer system of claim 23, wherein the means for constructing one or more file access policies using the file access profile comprises an interface module that applies an iterative scoring analysis to one or more file access profiles.

27. The computer system of claim 23, wherein the means for enforcing the one or more file access policies to manage access to one or more files managed by the file system comprises an enforcement module that intercepts one or more file access requests generated by one or more application modules and applies one or more access policies to the file access requests.

* * * * *